US009836680B1

(12) United States Patent
Cloutier

(10) Patent No.: US 9,836,680 B1
(45) Date of Patent: Dec. 5, 2017

(54) SYSTEMS AND METHODS FOR ADVANCED COMMUNICATION MECHANISMS FOR MAGNETIC CARDS AND DEVICES

(75) Inventor: Bruce S. Cloutier, Jeannette, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 13/411,228

(22) Filed: Mar. 2, 2012
(Under 37 CFR 1.47)

Related U.S. Application Data

(60) Provisional application No. 61/448,966, filed on Mar. 3, 2011.

(51) Int. Cl.
G06K 19/06 (2006.01)

(52) U.S. Cl.
CPC .............. G06K 19/06206 (2013.01)

(58) Field of Classification Search
CPC ........... G06K 19/077; G06K 19/06206; G06K 19/06187; G06K 19/06196
USPC .......................................... 235/493
See application file for complete search history.

(56) References Cited

U.S. PATENT DOCUMENTS

| 4,353,064 | A | 10/1982 | Stamm |
| 4,394,654 | A | 7/1983 | Hofmann-Cerfontaine |
| 4,614,861 | A | 9/1986 | Pavlov et al. |
| 4,667,087 | A | 5/1987 | Quintana |
| 4,701,601 | A | 10/1987 | Francini et al. |
| 4,720,860 | A | 1/1988 | Weiss |
| 4,786,791 | A | 11/1988 | Hodama |
| 4,791,283 | A | 12/1988 | Burkhardt |
| 4,797,542 | A | 1/1989 | Hara |
| 5,038,251 | A | 8/1991 | Sugiyama et al. |
| 5,168,520 | A | 12/1992 | Weiss |
| 5,237,614 | A | 8/1993 | Weiss |
| 5,276,311 | A | 1/1994 | Hennige |
| 5,347,580 | A | 9/1994 | Molva et al. |
| 5,361,062 | A | 11/1994 | Weiss et al. |
| 5,412,199 | A | 5/1995 | Finkelstein et al. |
| 5,434,398 | A | 7/1995 | Goldberg |
| 5,434,405 | A | 7/1995 | Finkelstein et al. |
| 5,478,994 | A | 12/1995 | Rahman |
| 5,479,512 | A | 12/1995 | Weiss |
| 5,484,997 | A | 1/1996 | Haynes |
| 5,485,519 | A | 1/1996 | Weiss |

(Continued)

FOREIGN PATENT DOCUMENTS

| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

Primary Examiner — Laura Gudorf

(57) ABSTRACT

A card may detect variations (e.g., position, velocity, acceleration and direction) of a read head in relation to the card. Based on certain parameters (e.g., card length, initially detected read head position, and read head velocity) the card may change communicated bit parameters (e.g., bit period) so that a total number of data bits may be communicated by the card to the read head while the read head remains within a communication distance of the card.

20 Claims, 6 Drawing Sheets

(56) References Cited

U.S. PATENT DOCUMENTS

| | | |
|---|---|---|
| 5,585,787 A | 12/1996 | Wallerstein |
| 5,591,949 A | 1/1997 | Bernstein |
| 5,608,203 A | 3/1997 | Finkelstein et al. |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 8,226,001 B1 * | 7/2012 | Foo ............... G06K 19/06206 235/449 |
| 2001/0034702 A1 | 10/2001 | Mockett et al. |
| 2001/0047335 A1 | 11/2001 | Arndt et al. |
| 2002/0019807 A1 * | 2/2002 | Halpern ..................... 705/39 |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |

(56) References Cited

U.S. PATENT DOCUMENTS

| | | |
|---|---|---|
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massacusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159681 A1* | 6/2009 | Mullen ............ G06K 19/06206 235/449 |
| 2009/0159700 A1 | 6/2009 | Mullen et al. |
| 2009/0159713 A1* | 6/2009 | Mullen et al. ................ 235/493 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

SYSTEMS AND METHODS FOR ADVANCED COMMUNICATION MECHANISMS FOR MAGNETIC CARDS AND DEVICES

CROSS-REFERENCE TO RELATED APPLICATION

This application claims the benefit of U.S. Provisional Patent Application No. 61/448,966, titled "SYSTEMS AND METHODS FOR ADVANCED COMMUNICATION MECHANISMS FOR MAGNETIC CARDS AND DEVICES," filed Mar. 3, 2011, which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID writer/reader and the RFID included on the card.

One or more detectors may be provided in a card, for example, to sense the presence of an external object, such as a person or device, which in turn, may trigger the initiation of a communication sequence with the external object. The sensed presence of the external object may then be communicated to a processor of the card, which in turn may direct the exchange of information between a card and the external object. Accordingly, timing aspects of the information exchange between an external object and the various I/O devices provided on a card may also be determined by circuitry (e.g., a processor) provided on a card.

The sensed presence of the external object or device may include the type of object or device that is detected and, therefore, may then determine the type of communication that is to be used with the detected object or device. For example, a detected object may include a determination that the object is a read-head housing of a magnetic stripe reader. Such an identifying detection, for example, may activate a dynamic magnetic stripe communications device so that information may be communicated to the read-head of the magnetic stripe reader. Information may be communicated by a dynamic magnetic stripe communications device, for example, by re-writing magnetic information on a magnetic medium that is able to be read by a magnetic stripe reader or electromagnetically communicating data to the magnetic stripe reader.

One or more read-head detectors, for example, may be provided on a card. The one or more read-head detectors may be provided as, for example, conductive pads that may be arranged along a length of a card having a variety of shapes. A property (e.g., a capacitance magnitude) of one or more of the conductive pads may, for example, change in response to contact with and/or the presence of an object. A card may be laminated such that all electronic circuitry and components (e.g., read-head detectors) are covered in a polymer. For example, an electronics package may be provided between two layers of polymer and a liquid polymer may be introduced between these layers and hardened to form a card.

A card may, for example, be swiped across a read-head of a magnetic stripe reader, such that a series of conductive pads arranged along a length of the card may be used to sequentially detect the presence of the read-head as the read-head moves in relation to the card. In doing so, a series of detections (e.g., the capacitance magnitude of each conductive pad may increase and/or decrease) may be generated, which may be indicative of a direction of a card swipe and/or a velocity of a card swipe and/or an acceleration of a card swipe. Changes in the velocity and/or acceleration of a card swipe during a card swipe may be detected by read-head detectors. Such information may be provided to circuitry (e.g., a processor) so that the information may be utilized to change the control of a dynamic magnetic stripe communications device. A dynamic magnetic stripe communications device may include, for example, multiple communication tracks such that multiple tracks of data may be communicated to a magnetic stripe reader.

A processor, or other circuitry, of a card may, for example, utilize a detection mechanism to determine a position of a read-head in relation to the card. Accordingly, a processor of a card may determine, for example, a relative position of a read head at the instant the read head is detected. Additionally, a processor of a card may determine, for example, a relative speed at which a read head may be moving across a card. In so doing, a processor of a card may determine an amount of time that the read head may remain over the card.

For example, a card length may, for example, be approximately 3.375 inches. The thickness of a card may be between, for example, approximately 27 to 33 thousandths of an inch thick (e.g., approximately 30-33 thousandths of an inch thick). By detecting a relative position of a read head and a relative velocity of the read head, for example, a processor of a card may determine a length of time that the read head may remain within a communication distance of the card.

A dynamic magnetic stripe communications device of a card may, for example, communicate a particular amount of data to a read head. In addition, a dynamic magnetic stripe communications device of a card may communicate that amount of data serially to the read head. Multiple tracks of information may be communicated simultaneously to different read-heads of a read-head housing and each track OF information may be communicated serially. Different tracks of information may be communicated to a read-head at different times with at least a portion of the information for each track being communicated simultaneously. Accordingly, for example, circuitry (e.g., a processor) of a card may determine a bit rate and/or a bit period that may be necessary to serially communicate that particular amount of data when the card determines a length of time that a detected read head may remain within a communication distance of the card.

A processor of a card may, for example, initiate a serial communication using an initial bit rate and/or bit period. A processor of a card may, for example, change the initial bit rate and/or bit period throughout a communication sequence with a read head. A processor of a card may, for example, begin serial communications with a read head using a slower bit rate and/or a longer bit period as compared to a bit rate and/or bit period used at the end of the communication sequence. In so doing, for example, a magnetic card reader may receive and acquire a signal from a card having a relatively slow bit rate and/or a long bit period initially. As the communication sequence progresses, for example, the magnetic card reader may receive and continuously track a signal from a card, the signal having an increasing bit rate and/or a diminishing bit period.

A processor of a card may, for example, calculate a bit rate and/or a bit period to be used by a dynamic magnetic stripe communications device of a card. The processor may, for example, determine a position of a read head and a relative velocity of the read head to determine an amount of time that the read head may remain within a communication distance from the card. The processor may, for example, calculate a number of communication bit periods that may be required to complete a communication sequence and determine a maximum bit period that each communicated bit may occupy.

If an amount of time required to complete a communication sequence is longer than an estimate of an amount of time that a read head will remain within a communication distance of a card, a processor of a card may, for example, reduce a bit period of one or more bits that may be contained in such a communication sequence. A processor of a card may, for example, begin a communication sequence with data bits that occupy a relatively large bit period. Once an associated read head has acquired the initial communication sequence from the card, a processor of the card may, for example, reduce subsequent bit periods of the communication sequence so that the communication sequence may be completed while an associated read head is within a communication distance of the card.

A processor of a card may, for example, reduce a bit period of each successive bit of a series of bits to generate a communication sequence in a particular amount of time. A processor of a card may, for example, apply a constant bit period to a first group of bits and successively reduce a constant bit period of subsequent groups of bits to generate a communication sequence in a particular amount of time.

A card may be inserted into a motorized card reader, whereby the card may be passed over a read head of the motorized card reader at a substantially constant, or a substantially varying, speed and direction. The card may, for example, detect such a speed and/or direction and may generate a communication sequence of bits that substantially corresponds to the detected speed and/or direction.

A processor of a card may, for example, detect two or more communication sequences within a relatively short amount of time (e.g., 1-3 seconds). For example, a card may be swiped across a read head of a point-of-sale device during a point-of-sale transaction, such that the read head is detected, a communication sequence is generated, but less than all of the bits communicated during the communication sequence are received by the point-of-sale device. Accordingly, for example, one or more subsequent card swipes and associated communication sequences (e.g., retries) may then subsequently follow in an effort to communicate successfully with the point-of-sale device.

A processor of a card may, for example, implement varying communication strategies during each retry. A retry strategy may, for example, simply include repeating the same communication sequence with the same communication parameters as was used during the previous communication attempt. A retry strategy may, for example, include communicating a single track of information rather than attempting to communicate multiple tracks of information, or portions of multiple tracks of information, simultaneously. A retry strategy may, for example, include changing one or more of the communication parameters (e.g., bit rate or bit period) used during a previous communication attempt.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
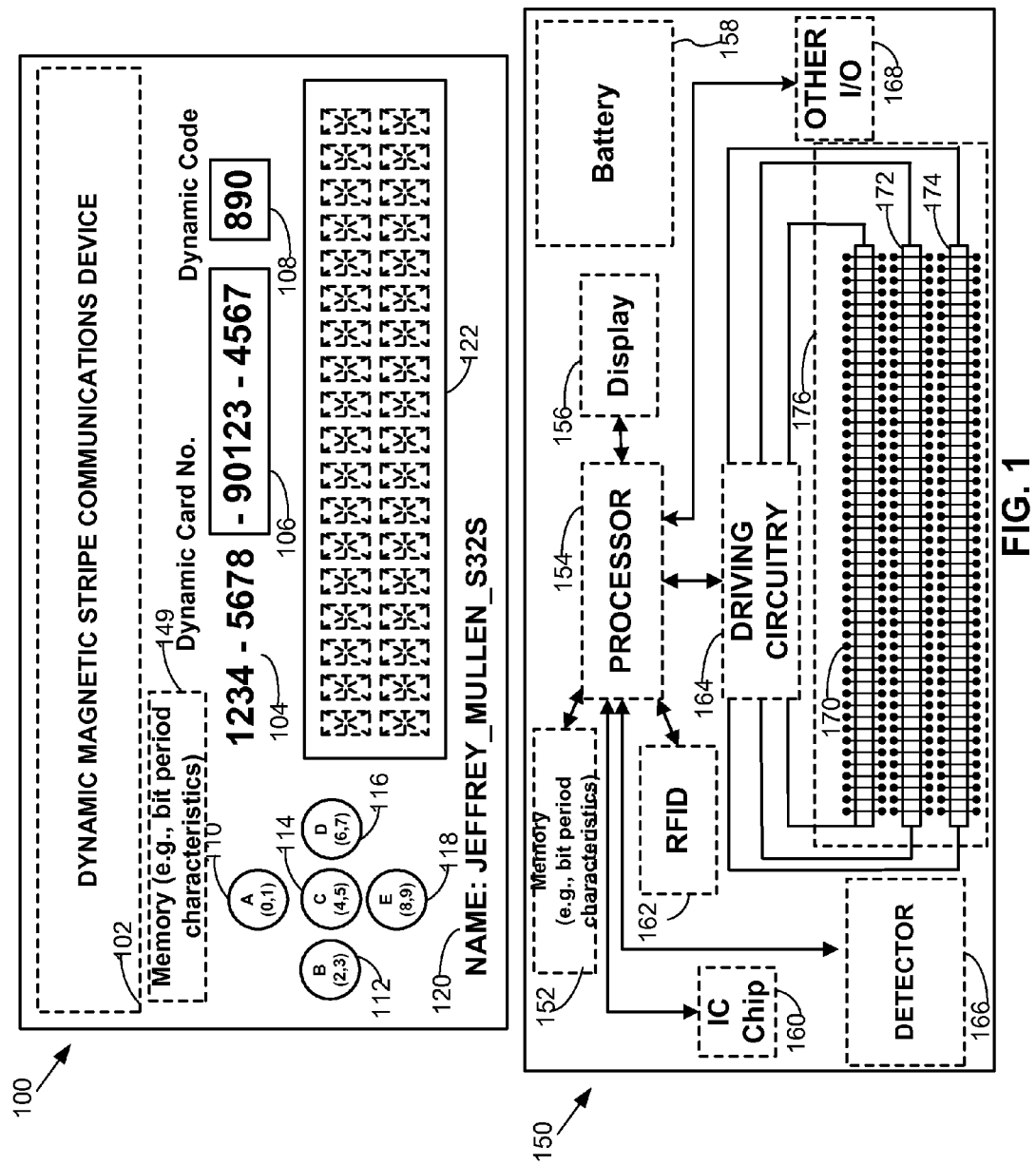
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input. Driving circuitry may, for example, receive control data from a processor to adjust a characteristic (e.g., a bit period) of each data bit that may be communicated from dynamic magnetic stripe communications device 102 to a detected read head. Such bit period characteristics may, for example, be stored in memory 149 and may be utilized by the processor to provide different drive signals to driving circuitry.

FIG. 1 shows architecture 150, which may include one or more processors 154. One or more processors 154 may be configured to utilize external memory 152, internal memory of processor 154, or a combination of external memory 152 and internal memory for dynamically storing information, such as executable machine language, related dynamic machine data, communication characteristics, and user input data values. Driving circuitry 164 may, for example, receive control data from processor 154 to adjust a characteristic (e.g., a bit period) of each data bit that may be communicated to a detected read head. Such bit period characteristics may, for example, be stored in memory 152 and may be utilized by processor 154 to provide different drive signals to driving circuitry 164.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included within architecture 150, that may communicate information to a chip reader (e.g., an EMV chip reader). Radio frequency identification (RFID) module 162 may be included within architecture 150 to enable the exchange of information with an RFID reader/writer.

Other input and/or output devices 168 may be included within architecture 150, for example, to provide any number of input and/or output capabilities. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or an electromagnetic data carrier.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

Electromagnetic field generators 170-174 may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented within architecture 150 may be determined by processor 154. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154), which in turn may direct the exchange of information between architecture 150 and the external device. The sensed presence and/or touch of the external device may be effective to, for example, determine the type of device or object detected.

For example, the detection may include the detection of, for example, a read-head of a magnetic stripe reader. In response, processor 154 may activate one or more electromagnetic field generators 170-174 to initiate a communications sequence with, for example, one or more read-heads of a magnetic stripe reader. The timing relationships associated with communications between one or more electromagnetic field generators 170-174 and one or more read-heads of a magnetic stripe reader may be provided through use of the detection of the magnetic stripe reader.

The detection may, for example, include a detection of a read head and its location and/or speed and/or acceleration relative to various areas of a card (e.g., card 100 of FIG. 1). For example, detector 166 may first detect a presence of a read head close to an edge of a card. Detector 166 may, for example, detect a read head and its velocity and/or changes in velocity relative to a card to determine an amount of time that a read head may remain within a communication distance from the card.

Processor 154 may receive location and/or speed and/or acceleration information from detector 166. Processor 154 may determine location and/or speed and/or acceleration information based on information received from detector 166. For example, detector 166 may include several (e.g., approximately 10 to 20) capacitive sensors and processor 154 may determine location and/or speed and/or acceleration information based on information received from these capacitive sensors. For example, processor 154 may receive location and/or speed and/or acceleration information associated with a read head that may be in a proximity or touch relationship with a card. Processor 154 may, for example, use such location and/or speed and/or acceleration information to control driving circuitry 164. Driving circuitry 164 may, for example, receive control data from processor 154 to adjust a characteristic (e.g., a bit period) of each data bit that may be communicated from electromagnetic field generators 170-174 to a detected read head. In so doing, for example, processor 154 may maximize the reliability of communications to a detected read head by optimizing communication parameters of each bit that may be communicated to the detected read head.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Figure 2:
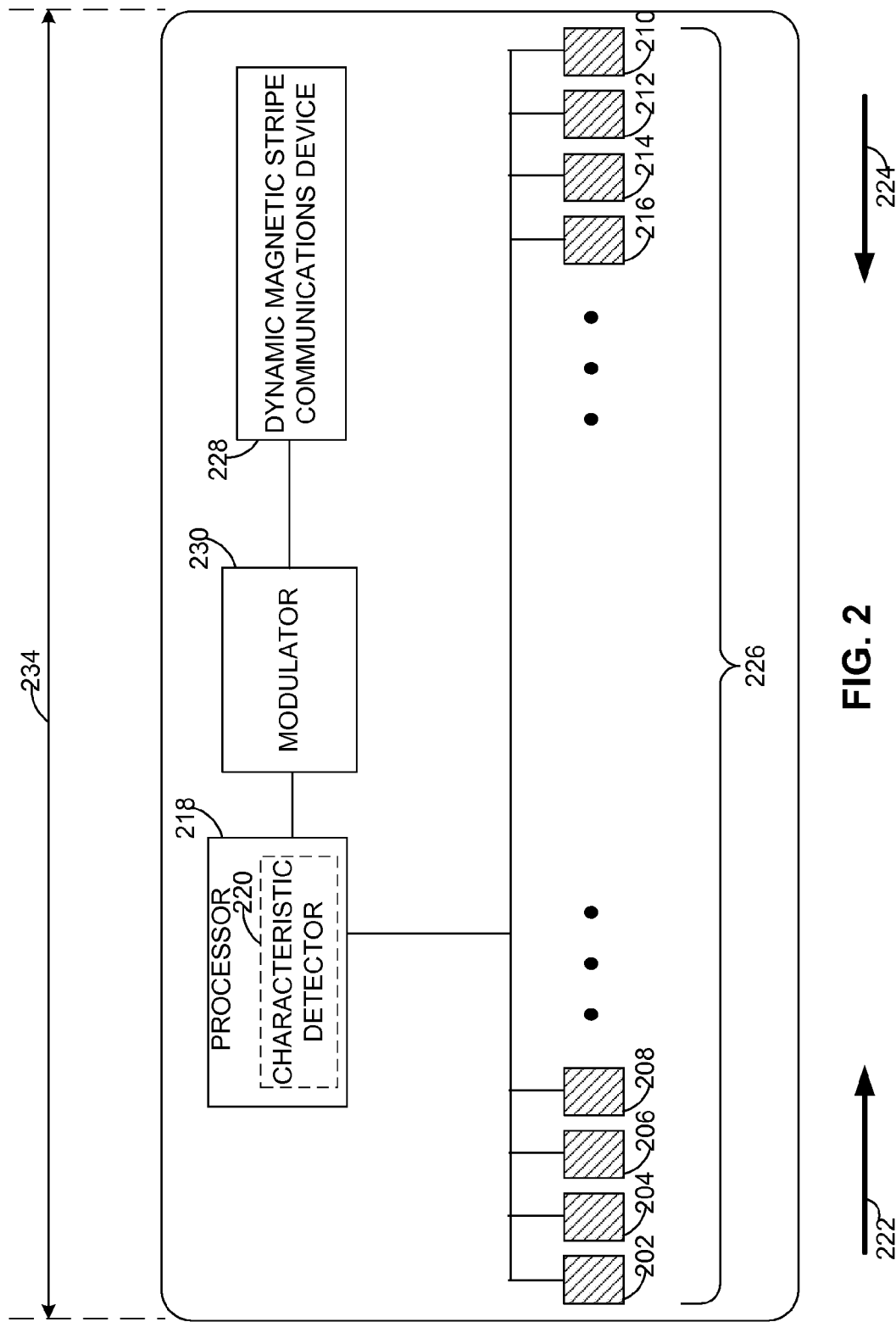
FIG. 2 is an illustration of a card constructed in accordance with the principles of the present invention.

FIG. 2 shows card 200 having an orientation of detectors 226, whereby one or more detectors 202-216 may be, for example, arranged along a length of card 200. Detectors 202-216 may be included, for example, as conductive pads using, for example, an additive technique, whereby patterns of a conductive element (e.g., copper) may be applied to a PCB substrate according to a patterning mask definition layer. Detectors 202-216 may be included, for example, as conductive pads using, for example, a subtractive technique whereby patterns of a conductive element (e.g., copper) may be removed from a pre-plated PCB substrate according to an etching mask definition layer. Other non-PCB fabrication techniques may be used to implement conductive pads 202-216 as may be required by a particular application.

Characteristic detector 220 of processor 218 may be utilized in conjunction with conductive pads 202-216 and processor 218 to detect a location of an object (e.g., a read head of a magnetic card reader) in relation to conductive pads 202-216. In addition, by monitoring a characteristic change (e.g., a capacitance change) associated with one or more conductive pads 202-216 and by comparing a characteristic change of neighboring conductive pads, a position and/or velocity and/or acceleration estimate of an object moving in relation to conductive pads 202-216 may be obtained.

Processor 218 may receive characteristic information from characteristic detector 220 and may then calculate position and/or velocity and/or acceleration estimates that may be based on the characteristic information. A position estimate, for example, may include an approximation of an initial location of a read head of a magnetic card reader that may be in proximity to, or in contact with, one or more of pads 202-216 as initially detected. A velocity estimate, for example, may include an approximation of a change in position of the read head as it moves across card 200 in either of directions 222 and/or 224. An acceleration estimate, for example, may include an approximation of a change in velocity of the read head as it moves across card 200 in either of directions 222 and/or 224.

Based upon position and/or velocity and/or acceleration estimates, processor 218 may estimate an amount of time that a detected read head may remain within a communication distance of card 200. In so doing, processor 218 may, for example, provide modulation control information to modulator 230 to modulate one or more characteristics (e.g., a bit period) of data that may be communicated by dynamic magnetic stripe communication device 228. Modulator 230 may energize dynamic magnetic stripe communications device 228 in accordance with the modulation control information, as provided by processor 218, so as to communicate data to the detected device (e.g., a read head of a magnetic card reader) while the detected device remains within a communication distance of card 200.

Figure 3:
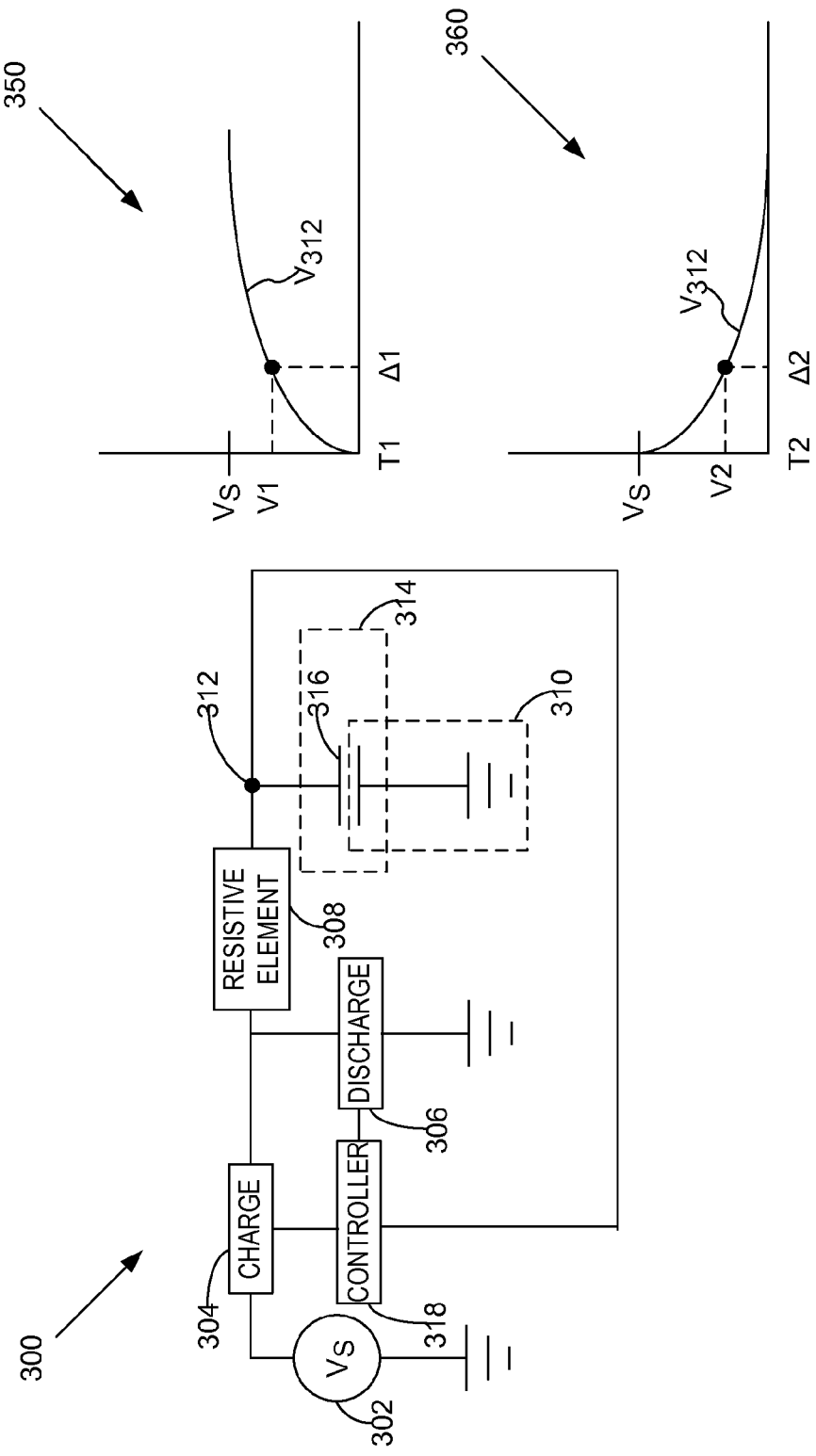
FIG. 3 is an illustration of circuitry, and associated waveforms, constructed in accordance with the principles of the present invention.

FIG. 3 shows a pad characteristic detection system that may be included on a card. A conductive pad may be utilized, for example, as a conductor of a capacitive device within a resistor/capacitor (RC) circuit to determine the capacitance of a conductive pad and determine whether it is below, equal to, or above one or more predetermined thresholds.

A conductive pad may, for example, form a portion of a capacitive element, such that plate 316 of capacitive element 314 may be implemented by the pad and the second plate of capacitive element 314 may be implemented by element 310. Element 310 may represent, for example, the device or object whose proximity or contact is sought to be detected.

The capacitance magnitude of capacitive element 314 may exhibit, for example, an inversely proportional relationship to the distance separation between plate 316 and object 310. For example, the capacitance magnitude of capacitive element 314 may be relatively low when the corresponding distance between plate 316 and object 310 may be relatively large. The capacitance magnitude of capacitive element 314 may be relatively large, for example, when the corresponding distance between plate 316 and object 310 may be relatively small.

Detection of the proximity or contact of an object may be accomplished, for example, via circuit 300 of FIG. 3. Through a sequence of charging and discharging events, an average capacitance magnitude for capacitive element 314 may be determined over time. In so doing, the spatial relationship (e.g., the proximity) between plate 316 and object 310 may be determined.

Charge sequence 350 may, for example, be invoked, such that charge circuit 304 may be activated at time T1, while discharge circuit 306 may remain deactivated. Accordingly, for example, current may flow through resistive element 308. In doing so, for example, an electrostatic field may be generated that may be associated with capacitive component 314. During the charge sequence, for example, the voltage at node 312 may be monitored by controller 318 to determine the amount of time required (e.g., $T_{CHARGE}=\Delta 1-T1$) for the voltage at node 312, $V_{312}$, to obtain a magnitude that is substantially equal to, below, or above a first threshold voltage (e.g., equal to V1).

Discharge sequence 360, for example, may be invoked, such that discharge circuit 306 may be activated at time T2, while charge circuit 304 may remain deactivated. During the discharge sequence, for example, the electric field associated with capacitive element 314 may be allowed to discharge through resistive element 308 to a reference potential (e.g., ground potential). The voltage at node 312 may be monitored by controller 318 to determine the amount of time required (e.g., $T_{DISCHARGE}=\Delta 2-T2$) for the voltage at node 312, $V_{312}$, to obtain a magnitude that is substantially equal to, below, or above a second threshold voltage (e.g., equal to V2).

Once the charge time, $T_{CHARGE}$, and discharge time, $T_{DISCHARGE}$, are determined, the charge and discharge times may be utilized to calculate a capacitance magnitude that may be exhibited by capacitive element 314. For example, given that the magnitude of voltage, V1, may be equal to approximately 63% of the magnitude of voltage, $V_S$, then a first relationship may be defined by equation (1) as:

$$T_{CHARGE}=R_{308}*C1, \quad (1)$$

where $R_{308}$ is the resistance magnitude of resistive element 308 and C1 is proportional to a capacitance magnitude of a capacitive element (e.g., capacitive element 314).

Similarly, for example, given the magnitude of voltage, V2, is equal to approximately 37% of the magnitude of voltage, $V_S$, then a second relationship may be determined by equation (2) as:

$$T_{DISCHARGE}=R_{308}*C2, \quad (2)$$

where C2 is proportional to a capacitance magnitude of capacitive element 314. The capacitance magnitudes, $C_1$ and $C_2$, may then be calculated from equations (1) and (2), respectively, and averaged to determine an average capacitance magnitude that is exhibited by capacitive element 314.

Circuits 304 and 306 may be activated and deactivated by controller 318. Accordingly, for example, controller 318 may control when the charge and discharge events occur. Controller 318 may adjust a frequency at which circuits 304 and 306 may be activated and/or deactivated, thereby adjusting a sampling rate at which the capacitance magnitudes, $C_1$ and $C_2$, may be measured. In so doing, a sampling rate (e.g., a lower sampling rate) may be selected in order to select a power consumption rate (e.g., a lower power consumption rate) of a card.

Turning back to FIG. 2, a series of charge and discharge sequences for pads 202-216 may be executed to determine, for example, a relative capacitance magnitude that is exhibited by each of pads 202-216. A series of charge and discharge sequences for each of pads 202-216 may be executed, for example, in order to obtain a capacitance characteristic for each of pads 202-216 over time.

By comparing the time-based capacitance characteristic of each pad 202-216 to a threshold capacitance value, a determination may be made, for example, as to when pads 202-216 are in a proximity, or touch, relationship with a device whose presence is to be detected. For example, a sequential change (e.g., increase) in the relative capacitance magnitudes of pads 202-208, respectively, and/or pads 216-210, respectively, may be detected. In so doing, a determination may be made that a device is moving substantially in direction 222 relative to card 200. A sequential change (e.g., increase) in the relative capacitance magnitudes of pads 210-216, respectively, and/or 208-202, respectively, may be detected. In so doing, a determination may be made that a device is moving substantially in direction 224 relative to card 200.

Persons skilled in the art will appreciate that by electrically shorting pairs of pads together (e.g., pair 202/210, pair 204/212, pair 206/214, etc.) directional vectors 222 and 224 become insubstantial. For example, regardless of whether a device is moving substantially in direction 222 or substantially in direction 224 relative to card 200, a determination may nevertheless be made that a device is close to, or touching, card 200.

Characteristic detector 220 of processor 218 may be used in conjunction with and one or more pads 202-216, for example, to determine that a device (e.g., a read-head housing of a magnetic stripe reader) is in close proximity, or touching, one or more of pads 202-216. In addition, processor 218 may determine a velocity of the detected device in either of directions 222 and/or 224. In addition, processor 218 may determine an acceleration of the detected device in either of directions 222 and/or 224. Once a device is detected, processor 218 may prepare, for example, dynamic magnetic stripe communications device 228, for communications with the detected device.

Preparation for communication, for example, may include an estimate of an amount of time that an object (e.g., a read head) may remain within a communication distance of card 200. For example, a length of card 200 may be, for example, approximately equal to 3.375 inches. A communication distance may, for example, be defined as any distance between an edge of card 200 and a detected location of, for example, a read head of a magnetic card reader within distance 234. A velocity estimate may, for example, be calculated by processor 218 as a rate of change of the detected location of the read head relative to card 200 over a period of time. The communication distance may then be divided by the estimated velocity of the read head to determine a communication time window that may be used by dynamic magnetic stripe communications device 228 of card 200 to communicate to the read head.

If, for example, a read head was initially detected by processor 218 of card 200 at pad 202 moving in direction 222, then the communication distance may be maximized, since the read head may be estimated to be within a proximity to card 200 for nearly the full length 234 of card 200. The communication time window may similarly be maximized, since the ratio of communication distance to estimated velocity is maximized.

Conversely, for example, if a read head was initially detected by processor 218 of card 200 at pad 210 moving in direction 222, then the communication distance may be minimized, since the read head may be estimated to be within a proximity to card 200 for a relatively short distance (e.g., the distance between pad 210 and the edge of card 200). The communication time window may similarly be minimized, since the ratio of communication distance to velocity is minimized.

A velocity estimate may be computed by processor 218. For example, by measuring an amount of time that a read head moves in relation to card 200 from one pad (e.g., pad 202) to another pad (e.g., pad 204) and by dividing the distance that exists between pads 202 and 204 by that amount of time, a velocity of the detected read head may be estimated.

A fixed number of data bits may, for example, be communicated by dynamic magnetic stripe communications device 228 of card 200 to an object (e.g., a read head of a magnetic card reader). For example, the communicated data may be magnetic stripe data (e.g., Track 1, Track 2, and/or Track 3 data) that may be communicated to a detected read head by dynamic magnetic stripe communications device 228. Accordingly, for example, a bit rate and/or bit period may be determined by processor 218 so that a fixed number of data bits may be communicated to the detected read head within the estimated communication time window.

For example, a number of data bits that may be communicated by dynamic magnetic stripe communications device 228 of card 200 to a detected read head may be equal to a fixed number of magnetic stripe data bits (e.g., 1000 bits). In addition, a read head position, velocity and/or acceleration detection by processor 218 of card 200 may result in an estimated communication time window (e.g., 200 mS). Such an estimate may be calculated by processor 218, for example, by determining that a read head may be moving in a certain direction (e.g., direction 222) at a certain velocity (e.g., 10 inches per second) and that the read head's position may be first detected in proximity to a certain pad (e.g., pad 208). Given that a distance (e.g., two inches) may exist between pad 208 and the opposite edge of card 200, then an approximate communication time window may be calculated to be approximately equal to 2/10=200 milliseconds.

A bit rate may be determined by processor 218 from the approximated communication time window by dividing the total number of data bits to be communicated (e.g., 1000) by the communication time window estimate (e.g., 200 mS). Accordingly, for example, a communication bit rate under these conditions yields an approximate serial communication rate of 5 kbps.

Persons skilled in the art will appreciate that the estimated communication time window may be dependent upon several factors (e.g., detected read-head speed and early vs. late read-head position detection) and as a consequence, the estimated communication time window may be reduced significantly. Accordingly, for example, the requisite serial bit rate may be increased significantly. Conversely, for example, the requisite serial bit period may be reduced significantly.

Processor 218 may, for example, increase reliability of communications between dynamic magnetic stripe communications device 228 of card 200 and a detected read head by modulating the data prior to communication. For example, a time period occupied by each data bit to be communicated may be adjusted in order to comply with a communication time window estimate. In so doing, processor 218 may begin a communication sequence by communicating data at a first bit period, but may end the communication sequence by communicating data at a different bit period.

Processor 218 may, for example, establish an initial bit period that may be predetermined as a minimum bit period required for reliable initial communications. Processor 218 may, for example, calculate an accelerated communications schedule, whereby each successive bit period may be reduced such that all data bits may be communicated within a given communication time window. Accordingly, for example, each successive data bit to be communicated may occupy a decreasing bit period so as to comply with the estimated communication time window allotted for a given communication sequence.

In so doing, for example, reliable communications may first be established between dynamic magnetic stripe communications device 228 of card 200 and a read head of a magnetic card reader by communicating data bits with a bit period that may be required by a magnetic card reader for initial communications to reliably occur. Thereafter, decreasing bit periods may be used, for example, since the bit period required by a magnetic card reader after communication is initiated may be less than the bit period initially required by the magnetic card reader.

Alternately, for example, processor 218 may meet the requirements of a communication time window by establishing a constant bit period for a first group of data bits to be communicated and then reducing the constant bit period for each successive group of data bits to be communicated. Persons skilled in the art will appreciate that other modulation techniques (e.g., increased bit rate or decreased bit period) may be used to effectively meet the requirements of a given communication time window.

Figure 4:
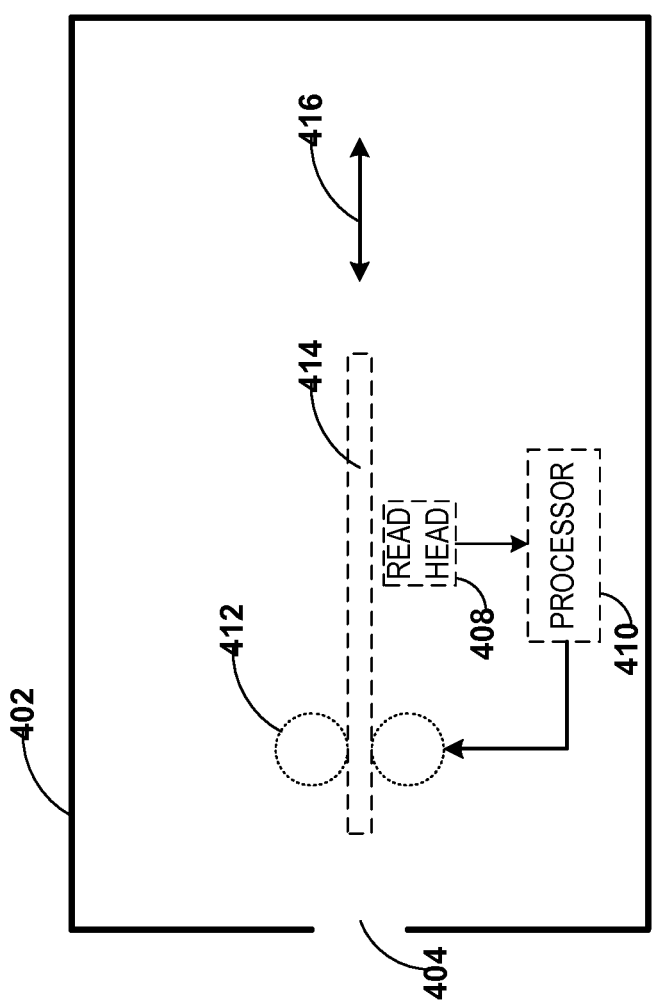
FIG. 4 is an illustration of a card reader constructed in accordance with the principles of the present invention.

FIG. 4 shows motorized magnetic card reader 400, which may include housing 402 and opening 404. Card reader 400 may accept card 414 via opening 404. Upon entry into housing 402, card 414 may be engaged by rollers 412. Accordingly, for example, a direction and/or velocity and/or acceleration of movement of card 414 may be controlled by processor 410 of card reader 400 while card 414 is engaged by rollers 412.

Card 414 may include a dynamic magnetic communications device, which may take the form of a magnetic encoder. A magnetic encoder, for example, may be utilized to modify information that is located on a magnetic medium, such that read head 408 may be utilized to read the modified magnetic information from the magnetic medium of card 414.

For example, modified magnetic information may be encoded onto card 414 having varying data densities (e.g., 210 bits per inch for Track 1/Track 3 and 75 bits per inch for Track 2). As card 414 is passed across read head 408, magnetic information may be communicated to read head 408 at a rate that may be proportional to a rate at which card 414 is passed across read head 408 by rollers 412.

For example, given that card 414 is passed across read head 408 at a rate of 7 inches per second, then Track 1 and/or Track 3 data may be magnetically communicated to read head 408 at a rate of 210*7=1470 bits per second, while Track 2 data may be magnetically communicated to read head 408 at a rate of 75*7=525 bits per second. At 30 inches per second, for example, a magnetic communication rate for Track 1 and/or Track 3 data may be 6300 bits per second, while Track 2 magnetic communication rate may be 2250 bits per second.

Card 414 may include a dynamic magnetic communications device, which may take the form of a magnetic emulator. A magnetic emulator, for example, may be utilized to serially communicate information electromagnetically to read head 408. By calculating a communication time window through a series of position and/or velocity and/or acceleration measurements, a processor of card 414 may calculate a required modulation format that may be imposed upon the data bits to be electromagnetically communicated from a dynamic magnetic communications device of card 414 to read head 408.

For example, given that a velocity estimate of card 414, as it is passed across read head 408 by rollers 412, is 10 inches per second and given that 1.2 inches of card length remains to be passed across read head 408, then a processor of card 414 may calculate a communication time window to be approximately equal to 120 ms. In so doing, a processor may modulate (e.g., modify a bit period) of each data bit to be communicated by a dynamic magnetic communications device of card 414, so that the entire bit sequence may be communicated within 120 ms.

Persons skilled in the art will appreciate that such position, speed, and/or acceleration measurements may be utilized by a card to calculate a communication time window and associated communication parameters, whether the card is placed within a motorized card reader or whether a card is manually swiped across a card reader. Persons skilled in the art will further appreciate that communication parameters may be modified during subsequent communication attempts in order to improve a likelihood of successful communications during subsequent communication attempts.

A processor of card 414 may, for example, detect movement of read head 408 relative to card 414 and may, therefore, initiate one or more communication sequences with read head 408 as each instance of read head 408 detection occurs. A processor of card 414 may, for example, track an occurrence of two or more communication sequences (e.g., retries) within a relatively short time period (e.g., 1-3 seconds) and may, therefore, initiate a varying communication strategy for each retry.

For example, a processor of card 414 may, upon detection of a retry, simply attempt to communicate with read head 408 using the same communication parameters as were used during the immediately preceding communication sequence. Accordingly, for example, a likelihood of successful communications may be improved by virtue of the retry.

Alternately, for example, a processor of card 414 may, upon detection of a retry, modify one or more communication parameters in an attempt to improve a likelihood of successful communications. Communication parameters such as bit rate and/or bit period, for example, may be modified in subsequent communication sequences.

Communicated data may be modified in order to improve a likelihood of successful communications during a subsequent communication sequence. A processor of a card may, for example, attempt to communicate multiple tracks of data simultaneously during a first communication sequence. Upon detection of a retry, the processor may, for example, modify the communicated data to include only a single track of data (e.g., Track-2 data), so that different tracks of data are not communicated simultaneously.

Figure 5:
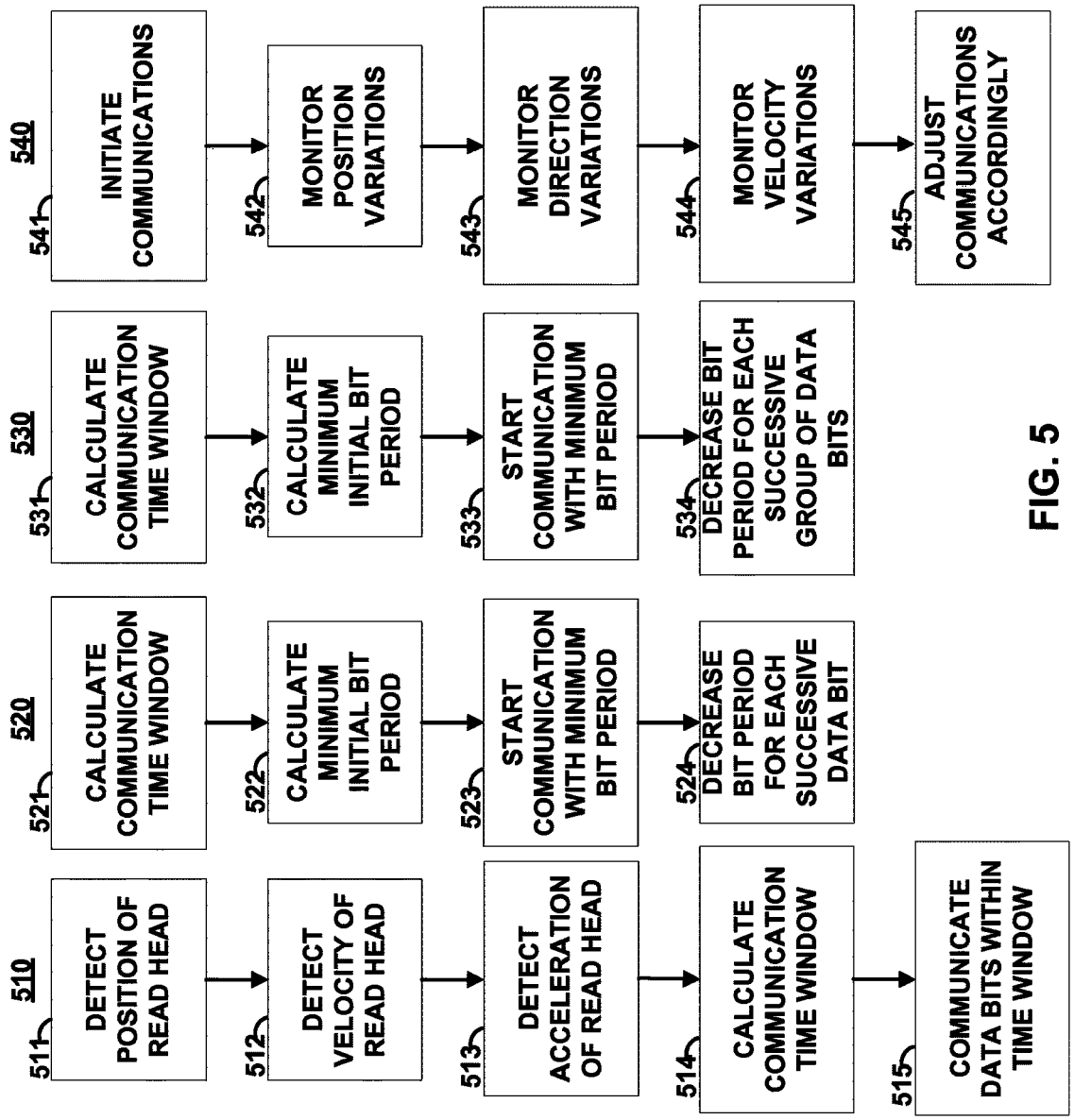
FIG. 5 is an illustration of a process flow chart constructed in accordance with the principles of the present invention.

A flow diagram of communication sequences is shown in FIG. 5. Step 511 of sequence 510 may, for example, detect a position of an object (e.g., a read head of a magnetic card reader) that may be in a proximity or touch relationship with a card. Step 512 may, for example, detect position variations of the object over time to determine a velocity of the object. Step 513 may, for example, detect velocity variations of the object over time to determine an acceleration of the object.

For example, a card may be swiped across a read head of a magnetic card reader and the card may detect a speed at which the read head moves relative to the card as the card is being swiped across the read head. A processor of a card may, for example, detect position and/or velocity and/or acceleration variations as the card is being swiped across a read head. The processor of a card may, for example, continue to make communication adjustments throughout a communication sequence in response to the detected position, velocity and/or acceleration variations.

A communication time window may be calculated by a processor on a card (e.g., as in step 514) based upon several factors (e.g., length of a card, velocity of read head movement relative to the card, and initially detected position of a read head). A processor of a card may, for example, determine a bit period and/or a bit rate to be used during the communication time window, so that a requisite number of data bits may be communicated to a read head (e.g., as in step 515) by a dynamic magnetic communications device of the card while the read head remains within a communication distance of the card (e.g., while the card remains directly under the read head).

Step 521 of sequence 520 may include a calculation of a communication time window by a processor of a card. The processor may calculate a minimum bit period (e.g., as in step 522) that may be used initially for reliable communications to a read head. A memory location, for example, within a card may provide information indicative of a minimum bit period that may be reliably used during initial communications with a read head. Alternately, for example, a magnetic card reader may communicate (e.g., via RFID) to an RFID device of a card certain parameters (e.g., a minimum bit period and/or maximum bit rate) that are to be adhered to in order for reliable communications to occur.

In step 522, for example, a processor of a card may calculate a number of bit periods required to communicate a requisite number of data bits to a card reader. If the number of bit periods exceeds the communication time window (e.g., as calculated in step 521), then a processor of a card may determine an acceleration factor to be used in order to communicate the requisite number of data bits within the communication time window.

For example, a processor of a card may calculate an amount by which a bit period of each successive bit of a communication sequence may be reduced in order for all data bits to be communicated within a communication time window. A processor of a card may then begin communications (e.g., as in step 523) with an initially acceptable bit period that may be required by the card reader for reliable communications. Once reliable communications are established (e.g., after one or more data bits are communicated with the initially acceptable bit period) then each subsequent bit period may be decreased (e.g., as in step 524) so as to complete communication of all data bits within the previously calculated communication time window. Such a communication sequence may take advantage of a card reader's ability to track decreasing bit periods and/or increasing bit rates once initial communications have been established.

Step 531 of sequence 530 may include a calculation of a communication time window by a processor of a card, followed by a calculation of a minimum bit period (e.g., as in step 532) to be used during such communications. In step 532, a processor of a card may also calculate a number of bit periods required to communicate a requisite number of data bits to a card reader. If the number of bit periods exceeds the communication time window (e.g., as calculated in step 531), then a processor of a card may determine an acceleration factor to be used in order to communicate the requisite number of data bits within the communication time window.

For example, a processor of a card may partition a certain number of data bits into two or more groups of data bits. A processor of a card may allocate the previously calculated bit period for all data bits in a first group of data bits to be communicated. A processor of a card may then reduce the bit period for each subsequent group of data bits. A processor of a card may then begin communications (e.g., as in step 533) by communicating the first group of data bits at an initially acceptable bit period. Each subsequent group of data bits may be communicated with decreasing bit periods (e.g., as in step 534) so as to complete communication of all data bits within the previously calculated communication time window. In so doing, a card reader's ability to receive data bits having decreasing bit periods and/or increasing bit rates after initial communications have been established may be utilized.

Step 541 of sequence 540 may include initiating communications from a dynamic magnetic communications device of a card to a detected read head, where communications may be established with an initial bit period and/or bit rate. In steps 542-544, position, direction, and velocity variations of a read head relative to a card may be monitored by processors and associated detection circuitry of a card. For example, a motorized card reader may provide anti-skimming functions whereby a card may be passed across a read head at varying speeds and/or varying directions. A processor of a card may monitor such variations and may adjust parameters (e.g., bit period, bit rate, and bit order) so that communications from a dynamic magnetic communications device of a card to the read head may correlate with the varied movements of the card in relation to the read head.

Alternately, for example, a user may exhibit non-uniform swiping characteristics. For example, a user may initiate a card swipe at high velocity and decelerate through completion of the swipe. A user may, for example, initiate a card swipe at low velocity and accelerate through completion of the swipe. A user may exhibit different swiping directions before completion of the swipe. A processor of a card may monitor such variations (e.g., as in steps 542-544) and adjust communications in accordance with the detected variations (e.g., as in step 545).

Figure 6:
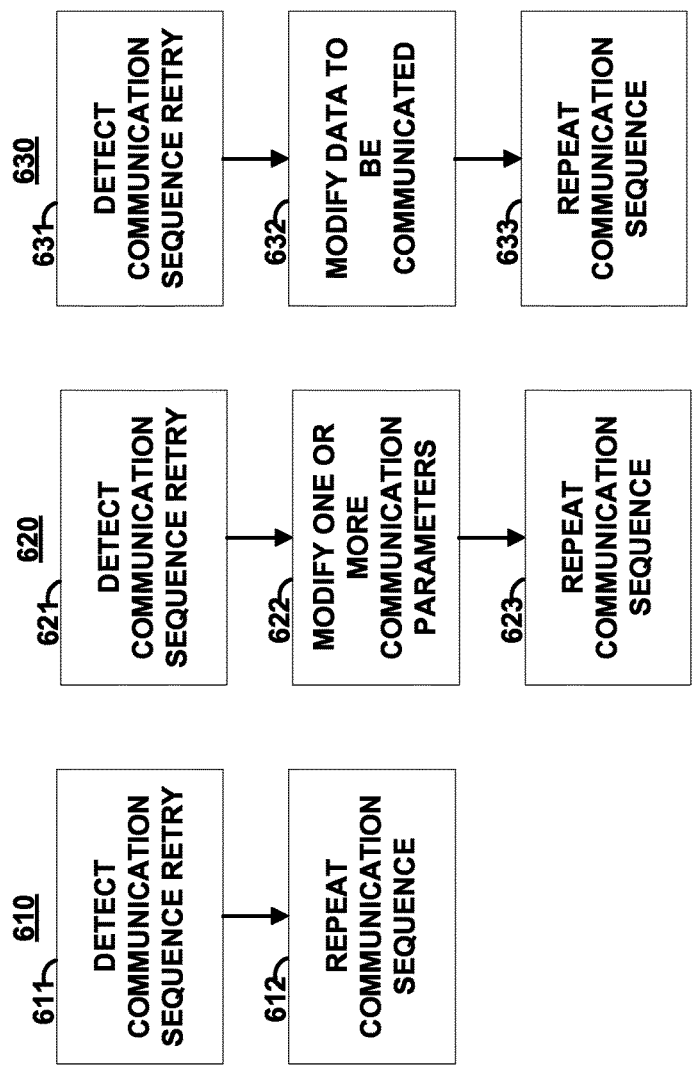
FIG. 6 is an illustration of a process flow chart constructed in accordance with the principles of the present invention.

A flow diagram of communication sequences is shown in FIG. 6. Step 611 of sequence 610 may, for example, detect a communication sequence that may occur within a relatively short period of time (e.g., up to 5 seconds) of a previously communicated communication sequence. In step 612, a subsequent communication sequence may be repeated whereby, for example, no communication parameters are changed as compared to the communication parameters used during the previous communication sequence. In so doing, the identical communication sequence may be repeated during a retry attempt, so as to increase a likelihood of a successfully received communication sequence during the retry attempt.

Step 621 of sequence 620 may, for example, detect a communication sequence retry (e.g., a communication sequence occurring within a relatively short amount of time after a previous communication sequence). In step 622, one or more communication parameters (e.g., bit period and/or bit rate) may be modified by a processor of a card. A subsequent communication sequence may employ the modified communication parameters to, for example, improve a likelihood that the modified communication sequence may be successfully received by a read head during a retry attempt (e.g., as in step 623).

Step 631 of sequence 630 may, for example, detect a communication sequence retry. A processor of a card may, therefore, modify the data to be communicated during a retry attempt (e.g., as in step 632). For example, an initial communication sequence may communicate multiple tracks (e.g., Track 1 and Track 2) of data simultaneously. Modification of the initial communication sequence may, for example, remove Track-1 data from the communication sequence, such that only Track-2 data is communicated during the retry attempt (e.g., as in step 633). In many instances, for example, Track-1 data may not necessarily be required to complete a particular transaction. Accordingly, for example, by removing Track-1 data from the communication sequence on a retry attempt, a likelihood of successful receipt of the modified communication sequence may be increased while not necessarily jeopardizing the success of the transaction.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
   detecting position variations of a read head in relation to a card;
   calculating a time window to communicate data to said read head based on said position variations; and
   varying at least one communication parameter to communicate said data within said time window,
   wherein said data includes a first portion and a second portion, and
   a value of said at least one communication parameter for said first portion is different than a value of said at least one communication parameter for said second portion.

2. The method of claim 1, wherein detecting position variations comprises measuring a change in capacitance of a pad on said card.

3. The method of claim 1, wherein detecting position variations comprises measuring a change in capacitance of a plurality of pads on said card and comparing said changes for each pad.

4. The method of claim 1, wherein said varying at least one communication parameter comprises reducing a bit period of said data,
   wherein said bit period is a unit of time per bit.

5. The method of claim 1, wherein said varying at least one communication parameter comprises increasing a bit rate of said data,
   wherein said bit rate is bits per unit of time.

6. The method of claim 1, wherein said varying at least one communication parameter comprises:
   communicating said first portion of said data at a first bit rate; and
   communicating said second portion of said data at a second bit rate, said second bit rate being higher than said first bit rate,
   wherein bit rate is bits per unit of time.

7. The method of claim 1, wherein said varying at least one communication parameter comprises:

communicating said first portion of said data using a first bit period; and communicating said second portion of said data using a second bit period, said first bit period being longer than said second bit period, wherein bit period is a unit of time per bit.

8. A card, comprising:

a dynamic magnetic stripe communications device;

a detector; and a modulator, wherein said detector is operable to detect characteristics of an object in proximity to said card, and said modulator is operable to modify communication parameters of data communicated by said dynamic magnetic stripe communications device based on said detected characteristics such that a plurality of portions of said data are communicated using different communication parameters during a communication.

9. The card of claim 8, wherein said characteristics comprise a detected position of said object.

10. The card of claim 8, wherein said characteristics comprises:

a detected position of said object; and a detected velocity of said object.

11. The card of claim 8, wherein said characteristics comprises:

a detected position of said object;

a detected velocity of said object; and a detected acceleration of said object.

12. The card of claim 8, wherein said characteristics comprise a detected direction of movement of said object.

13. The card of claim 8, wherein said detector comprises a plurality of conductive pads arranged along said card.

14. The card of claim 8, wherein said detector comprises:

a plurality of conductive pads arranged along said card; and a circuit operative to measure a capacitance of one or more of said plurality of conductive pads.

15. The card of claim 8, wherein said modulator is operable to modify a bit period of said data based on a detected position of said object, and said bit period is a unit of time per bit.

16. The card of claim 8, wherein said modulator is operable to modify a bit period of said data based on a detected position and a detected velocity of said object, and said bit period is a unit of time per bit.

17. The card of claim 8, wherein said modulator is operable to modify a bit period of said data based on a detected position, a detected velocity, and a detected acceleration of said object, and said bit period is a unit of time per bit.

18. The card of claim 8, wherein said modulator is operable to modify a bit rate of said data based on a detected position of said object, and said bit rate is bits per unit of time.

19. The card of claim 8, wherein said modulator is operable to modify a bit rate of said data based on a detected position and a detected velocity of said object, and said bit rate is bits per unit of time.

20. The card of claim 8, wherein said modulator is operable to modify a bit rate of said data based on a detected position, a detected velocity, and a detected acceleration of said object, and said bit rate is bits per unit of time.

* * * * *